(12) United States Patent
Yamanouchi

(10) Patent No.: US 8,654,425 B2
(45) Date of Patent: Feb. 18, 2014

(54) OPTICAL DETECTION DEVICE, OPTICAL DEVICE, OPTICAL INFORMATION READING DEVICE, AND LIGHT SOURCE FIXING METHOD

(71) Applicant: Optoelectronics Co., Ltd., Saitama (JP)

(72) Inventor: Masayoshi Yamanouchi, Saitma (JP)

(73) Assignee: Optoelectronics Co., Ltd. (JP)

( * ) Notice: Subject to any disclaimer, the term of this patent is extended or adjusted under 35 U.S.C. 154(b) by 0 days.

(21) Appl. No.: 13/765,637

(22) Filed: Feb. 12, 2013

(65) Prior Publication Data

US 2013/0153660 A1 Jun. 20, 2013

Related U.S. Application Data

(63) Continuation of application No. PCT/JP2011/068270, filed on Aug. 10, 2011.

(30) Foreign Application Priority Data

Aug. 13, 2010 (JP) .................................. 2010-181430
Aug. 13, 2010 (JP) .................................. 2010-181432

(51) Int. Cl.
*G02B 26/08* (2006.01)

(52) U.S. Cl.
USPC ...................................................... 359/206.1

(58) Field of Classification Search
USPC ............................. 359/196.1–226.3, 642–830
See application file for complete search history.

(56) References Cited

U.S. PATENT DOCUMENTS

| | | | | |
|---|---|---|---|---|
| 5,181,224 A | * | 1/1993 | Snyder | ........................ 372/101 |
| 6,661,582 B1 | * | 12/2003 | Rolt | .............................. 359/668 |
| 2004/0240205 A1 | | 12/2004 | Hayakawa et al. | |

FOREIGN PATENT DOCUMENTS

| | | |
|---|---|---|
| JP | 1181488 A | 7/1989 |
| JP | 10070340 A | 3/1998 |

(Continued)

OTHER PUBLICATIONS

ISA, "International Application No. PCT/JP2011/068270 International Search Report", Oct. 25, 2011, Publisher: PCT, Published in: JP.

(Continued)

*Primary Examiner* — Jennifer L. Doak

(74) *Attorney, Agent, or Firm* — Kaplan, Breyer, Schwarz & Ottesen, LLP

(57) ABSTRACT

Provided is an optical detecting device, wherein a photodiode is provided on a first surface of a substrate, a planar output electrode for outputting electrical signals corresponding to a quantity of light received by the photodiode is provided on a second surface of the substrate opposite to the first surface, a cutout portion is provided in a third surface of the substrate such that the cutout portion is in contact with the output electrode provided on the second surface, said third surface being different from the first surface and the second surface, and an electrode connected to the output electrode is provided on the inner surface of the cutout portion.

5 Claims, 11 Drawing Sheets

(56) References Cited

FOREIGN PATENT DOCUMENTS

| | | |
|---|---|---|
| JP | 2000012773 A | 1/2000 |
| JP | 2001177159 A | 6/2001 |
| JP | 2002198572 A | 7/2002 |
| JP | 2003007911 A | 1/2003 |
| JP | 2004126533 A | 4/2004 |
| JP | 2005039177 A | 2/2005 |
| JP | 4331597 B2 | 9/2009 |
| JP | 2009-259058 A | 11/2009 |
| JP | 2009259058 A | 11/2009 |
| WO | 03019463 A1 | 3/2003 |

OTHER PUBLICATIONS

ISA, "International Application No. PCT/JP2011/068270 Written Opinion of the International Searching Authority", Oct. 25, 2011, Publisher: PCT, Published in: JP.

JPO, "International Application No. PCT/JP2011/068270 International Search Report", Oct. 25, 2011, Publisher: JPO, Published in: JP.

* cited by examiner

OPTICAL DETECTION DEVICE, OPTICAL DEVICE, OPTICAL INFORMATION READING DEVICE, AND LIGHT SOURCE FIXING METHOD

RELATED APPLICATIONS

This application is a Continuation of PCT application Serial No. PCT/JP2011/068270 filed Aug. 10, 2011 which in turns claims priority to Japanese Patent Application Serial No. 2010-181432, filed Aug. 13, 2010, and Japanese Patent Application Serial No. 2010-181430, filed Aug. 13, 2010, all of which applications are hereby incorporated by reference herein.

BACKGROUND

The invention relates to an optical detection device including a photodetector element and outputting an electrical signal according to a light amount received by the photodetector element, an optical device including such an optical detection device on a substrate, an optical device including an irradiating means irradiating a target object with a light, and an optical information reading device including such optical devices and reading information indicated by a code symbol in which modules having different light reflectivity from surroundings are arranged. Further, the invention also relates to a light source fixing method for fixing a light source unit to the above-described optical device.

A code symbol called a bar code or a two-dimensional code is an image formed of modules of black bars (or simply "bars") with low light reflectivity and white bars (or spaces) with high light reflectivity.

In general, a method is well known which represents information related to an item by such a code symbol, prints or attaches this code symbol to the item, and reads this code symbol with an optical information reading device. As a field of use, a POS (Point Of Sales) system disposed in a retail store such as a supermarket or the like is a representative example, but besides that, the field ranges broadly over distribution of goods, mail service, event place management, medical service, chemical inspection, and so on.

Then, to classify roughly, as the optical information reading device, there are laser code scanners using laser and area sensor scanners using a camera which uses a CCD (Charge Coupled Device), CMOS (Complementary Metal Oxide Semiconductor), or the like. Among them, as compared to the area sensor scanners, the laser code scanners have a long history and technologies built up, and hence are highly reliable.

In such a laser code scanner, there is mounted a small light scanning module which scans a reading target object with a light flux (laser light) using a semiconductor laser element as a light source, and decodes information from a reflected light thereof. Then, for this light scanning module, a method to rotate a polygon mirror and a scanning mirror method to vibrate one mirror are known as methods for deflecting a laser light for scanning.

For example, PTL1 describes a bar code reader which emits a light from a light emitting element such as a semiconductor laser and reflects the light by one surface of the polygon mirror toward the reading target object. PTL2 describes an optical information reading device in which a laser beam emitted from a light emitting unit is reflected by a vibrating mirror, which vibrates in a seesaw manner, toward the reading target object.

In these devices, for illuminating the reading target object with a large amount of light fluxes, the former device is equipped with a polygon mirror having many reflecting surfaces, and the latter device vibrates a mirror with one surface. The amount of light fluxes illuminating the reading target object relates also to accuracy when decoding the code symbol, and illuminating with a large amount of light fluxes enables good decoding.

CITATION LIST

Patent Literature

PTL1: JP 2009-259058 A; and PTL2: JP 4331597 B2.

SUMMARY OF THE INVENTION

Now, in addition to the decoding accuracy as described above, size reduction and thickness reduction of the light scanning module performing scanning of a light beam and detection of a reflected light, which is to be mounted in the optical information reading device, are major challenges. It is because the light scanning module is mounted not only in, as is conventional, a dedicated device for reading information such as a handheld scanner, but also scenes of mounting the light scanning module further additionally in multifunction electronic devices such as handy terminals and smart phones are increasing.

The light scanning module using the technology described in PTL2 was recognized as the world smallest module when it was released, but further size reduction is demanded nowadays.

Then, a problem that arises in an attempted to carry out this size reduction is the optical function of the module. Specifically, when the module is reduced in size, unless it is structured such that an optical flux having sufficient intensity moves forward and backward inside, the intensity of the light flux for scanning the reading target object becomes weak, and this leads to reduction in decoding accuracy.

The present invention is made in view of such a background, and an object thereof is to enable size reduction of an optical device which scans a target object with a light beam and detects a reflected light thereof, and an optical information reading device using a module having such a function.

To achieve the object, an embodiment of the invention may include an optical detection device including a photodetector element provided on a first surface of a substrate and a planar output electrode provided on a second surface opposite to the first surface of the substrate for outputting an electrical signal according to a light amount received by the photodetector element, further including: a cutout portion provided on a third surface of the substrate that is different from the first surface and the second surface, the cutout portion being in contact with the output electrode provided on the second surface; and an electrode connected to the output electrode and provided on an inner surface of the cutout portion.

In such an optical detection device, it is preferable that the third surface is a surface substantially perpendicular to the first surface.

Further, an optical device of the invention includes: a circuit substrate on which a connection electrode is provided; and any of the above described optical detection devices disposed such that the cutout portion opposes the connection electrode on the circuit substrate to be connected to the output electrode and that the first surface is substantially perpendicular to a surface on which the connection electrode of the circuit substrate is provided, wherein the output electrode and the connection electrode on the circuit substrate are connected electrically by a conductive material filled in the cut-out portion.

In such an optical device according, it is preferable that the device further includes: an irradiating means for irradiating a reading target object with a light; and an optical member for allowing a reflected light from the reading target object to be incident on the photodetector element provided on the substrate of the optical detection device, wherein an optical path of the reflected light from being incident on the optical member to being incident on the photodetector element is substantially parallel to a surface on which the connection electrode of the circuit substrate is provided.

Further, another optical device of the invention includes an irradiating means for irradiating a target object with a light, wherein the irradiating means includes a light source unit including a laser light source outputting a laser light and a collimator lens passing the laser light outputted by the laser light source, wherein the optical device further includes a pedestal for disposing the light source unit such that the laser light source outputs the laser light in a direction along an optical path which passes through an optical axis of the collimator lens, and wherein the light source unit is fixed by a first fixing means to the pedestal to be movable only in a direction along the optical path, and further fixed by a second fixing means different from the first fixing means to the pedestal to be unmovable in the direction along the optical path.

In such an optical device, it is preferable that the pedestal has a trench in a direction along the optical path, and at least a part of the light source unit is inserted in the trench provided in the pedestal and is restricted in movement to a direction different from the trench.

Further, it is preferable that the light source unit and the pedestal respectively include a pair of projecting portions at positions where the projecting portions on the light source unit side and the projecting portions on the pedestal side are in contact with each other via a flat surface when the light source unit is disposed on the pedestal, the projecting portions having a substantially constant width in a direction along the optical path, and the first fixing means is a clip having elasticity which fixes the projecting portions on the light source unit side and the projecting portions on the pedestal side by sandwiching them in a state of being in contact with each other.

Furthermore, it is preferable that a gap is provided in an exterior for inserting, from a direction perpendicular to the optical path, the clip sandwiching the projecting portions on the light source unit side and the projecting portions on the pedestal side.

Besides, in the above optical device, it is preferable that the irradiating means is a means for irradiating a target object with a laser light outputted from the laser light source via the collimator lens and an aperture having a slit-shaped opening, and the collimator lens is disposed before the aperture in the optical path of the laser beam, and has a same shape as the opening of the aperture and a size such that the laser beam which passed through the collimator lens reaches the aperture with a size larger than the opening.

Further, it is preferable that the collimator lens disposed before the aperture is a lens having a power of a cylindrical lens on one surface and having a power of a collimator lens on another surface, and makes the laser beam outputted from the laser light source form an elliptic beam spot.

Besides, in the above optical device, it is preferable that the irradiating means and a vibrating mirror for deflecting the laser light outputted by the laser light source of the irradiating means to scan the target object are provided in an exterior, and an opening is provided in one surface of the exterior, and a rotation shaft of the vibrating mirror and a bearing for rotatably fixing the vibrating mirror to the rotation shaft are disposed to penetrate the opening.

Further, it is preferable that a cover covering the rotation shaft and the bearing which penetrate the opening is provided on the one surface of the exterior.

Furthermore, it is preferable that the one surface of the exterior is formed of a circuit substrate, and the circuit substrate is fixed by a fastener to a case forming another surface of the exterior.

Further, an optical information reading device of the invention includes any of the above optical devices and reads information indicated by a code symbol in which modules having different light reflectivity from surroundings are arranged.

Besides, a light source fixing method of the invention is a method for fixing, when an optical device including an irradiating means for irradiating a target object with a light is produced, a light source unit including a laser light source outputting a laser light as a light source of the irradiating means to a case of the optical device, the method executing sequentially: a first step of preparing the case of the optical device, to which a collimator lens is fixed, including a pedestal for disposing the light source unit such that the laser light source outputs the laser light in substantially parallel to an optical path which passes through an optical axis of the collimator lens; a second step of fixing the light source unit to the pedestal to be movable only in a direction along the optical path, by a first fixing means; a third step of moving the light source unit in a direction along the optical path to adjust a position thereof to a position where the laser light outputted by the laser light source becomes a parallel light by the collimator lens; and a fourth step of fixing the light source unit to the pedestal to be unmovable in the direction along the optical path, by a second fixing means different from the first fixing means.

In such a light source fixing method, it is preferable that the pedestal has a trench in a direction along the optical path, and the second step includes a step of inserting at least a part of the light source unit in the trench provided in the pedestal.

Further, it is preferable that the light source unit and the pedestal respectively include a pair of projecting portions at positions where the projecting portions on the light source unit side and the projecting portions on the pedestal side are in contact with each other via a flat surface when the light source unit is disposed on the pedestal, the projecting portions having a substantially constant width in a direction along the optical path, and in the second step, the projecting portion on the light source unit side and the projecting portion on the pedestal side are fixed with a clip having elasticity and inserted from a direction perpendicular to the optical path by sandwiching the projecting portions in a state of being in contact with each other.

By using an optical detection device, an optical device, or a light source fixing method according to the invention, a module which scans a target object with a light beam and detects a reflected light thereof can be reduced in size. Further, by an optical information reading device of the invention, a device can be reduced in size by utilizing the optical detection device or an optical device as described above.

DETAILED DESCRIPTION OF THE PREFERRED EMBODIMENTS

Hereinafter, embodiments for carrying out the invention will be described specifically based on the drawings.

An embodiment of an optical device: FIG. 1 to FIG. 16B.

First, a light scanning module which is an embodiment of an optical device including an optical detection device of the invention will be described.

Figure 1:
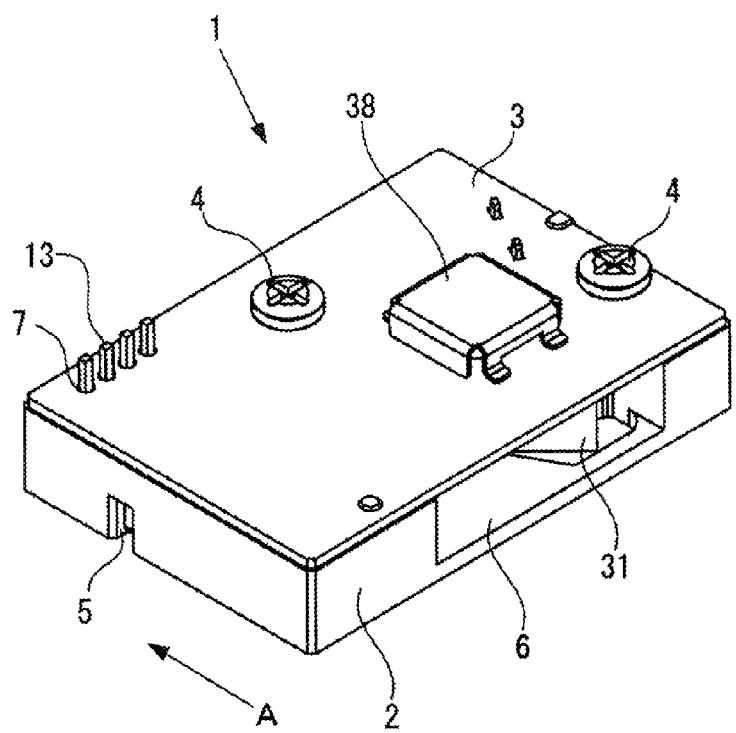
FIG. 1 is a perspective view of a light scanning module which is an embodiment of an optical device of the invention.
Figure 2:
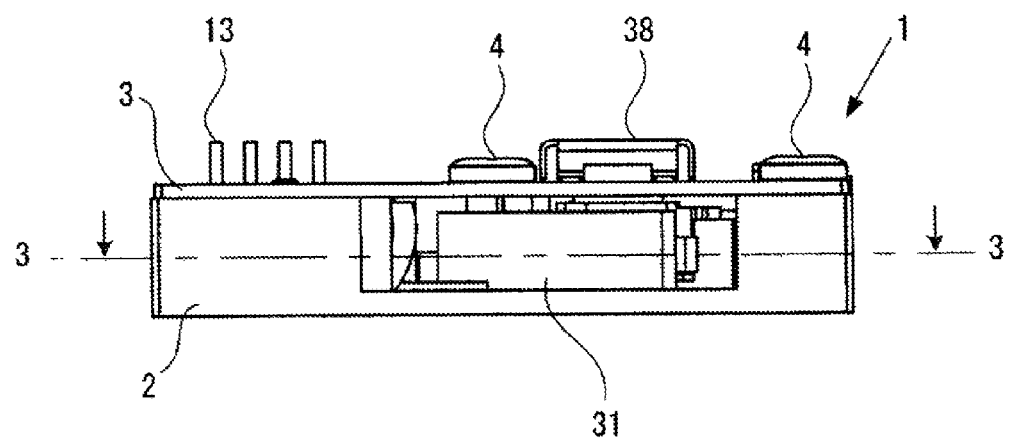
FIG. 2 is a front view seen from an arrow A direction of FIG. 1.
Figure 3:
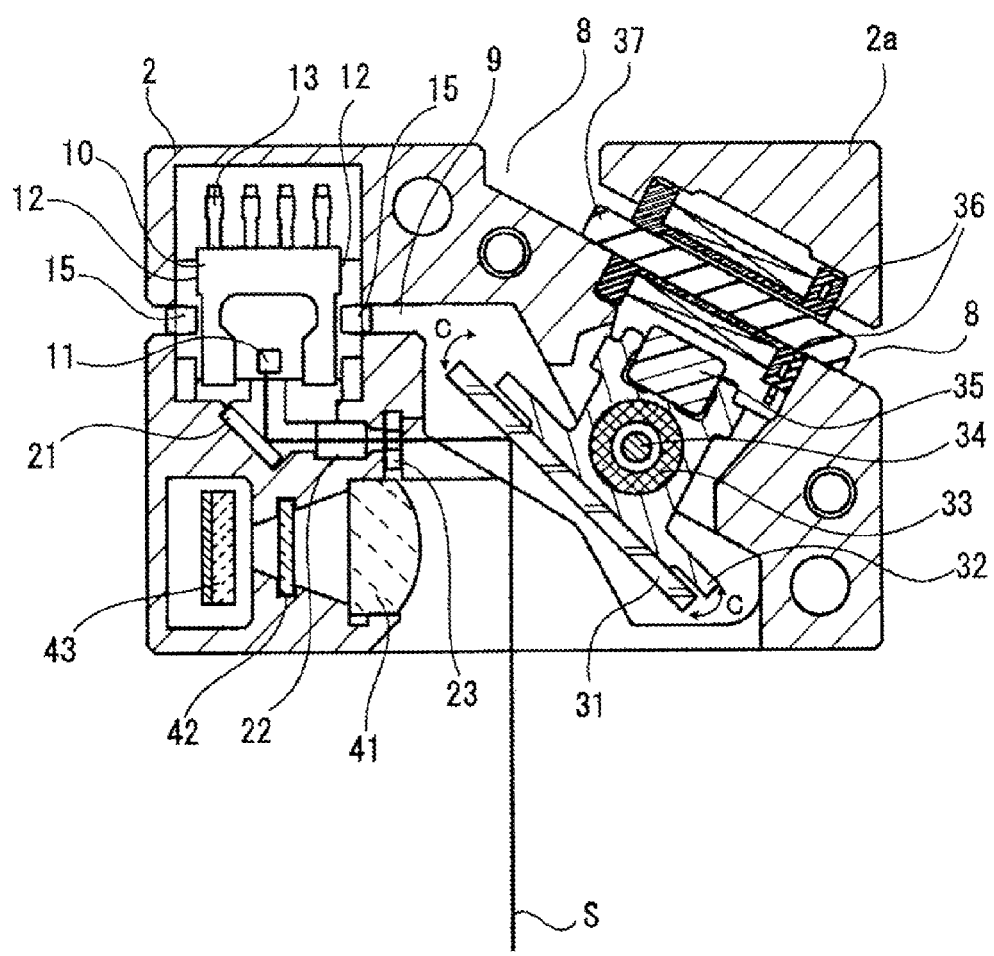
FIG. 3 is a cross-sectional view taken along a 3-3 line of FIG. 2.

FIG. 1 illustrates a perspective view of this light scanning module, FIG. 2 illustrates a front view seen from an arrow A direction of FIG. 1, and FIG. 3 illustrates a cross-sectional view taken along a 3-3 line of FIG. 2. Note that in FIG. 3, the hatching representing a cross section is omitted in areas other than a module case 2.

In this light scanning module 1, the exterior is structured by screw-clamping a module case 2 and a circuit substrate 3 with two screws 4, 4 as illustrated in FIG. 1 and FIG. 2.

Among them, the module case 2 is formed of a zinc alloy called ZDC2 by a die casting method, and has a size of 14 mm in depth (D), 20.4 mm in width (W), and 3.4 mm in height (H) as an entire external shape. Instead of the zinc alloy, aluminum or aluminum alloy, or a magnesium alloy may be used. Note that the reasons for forming of such a metal are that sufficient precision and strength can be obtained, and to obtain a shield effect for a later described LSI. When the shield effect is considered separately, the module case may be formed of a resin such as a reinforced plastic.

Then, the module case 2, as will be described later, is provided with a slit 5 for inserting a clip 15 for fixing a laser light source unit 10 to the module case 2, and an opening 6 for emitting a laser beam for scanning and allowing incidence of a reflected light to be detected. Note that in FIG. 3, the part indicated by a reference sign 2a among the module case 2 appears to be separated from other parts, but this part is connected to the other parts via a part above the 3-3 line of FIG. 2.

Further, the circuit substrate 3 is provided with through holes 7 for allowing insertion of terminals 13 of the laser light source unit 10 and a through hole for allowing insertion of a support shaft 34 of a vibrating mirror 31 and a bearing 33 thereof as will be described later. Note that the latter through hole is illustrated in a state of being covered with a cover 38 in FIG. 1 and is not represented in the view.

Further, the module case 2 and the circuit substrate 3 include many parts inside, as illustrated in FIG. 3. Next, they will be described with reference to FIG. 3. Note that important ones among the components represented in FIG. 3 will be described in detail later, and thus descriptions of respective parts using FIG. 3 are given only for outlines.

First, the module case 2 includes a laser light source unit 10 as a light source for an irradiating means for irradiating a target object with a laser light. This laser light source unit 10 is formed as a thin package laser, and includes in the vicinity of one end thereof a semiconductor laser body 11 which is a laser light source outputting a laser light. Further, a pair of flange-shaped projecting portions 12, 12 is provided on side faces, which are pressure clamped with clips 15, 15 respectively onto corresponding projecting portions on ends of a pedestal provided on the module case 2. Note that the projecting portions of the ends of the pedestal are not represented in FIG. 3. Further, in the laser light source unit 10, four terminals 13 are provided on an end opposite to the semiconductor laser body 11, and these terminals are exposed to the outside of the light scanning module 1 via the through holes 7 provided in the circuit substrate 3, enabling input of a drive signal for driving the laser light source unit 10 from the outside.

Next, the module case 2 includes a mirror 21, a lens 22, and an aperture 23 as optical elements forming a projection optical system for projecting a laser light emitted by the semiconductor laser body 11, which the laser light source unit 10 includes, as a laser beam forming an elliptic beam spot.

Among them, the mirror 21 is a fixed mirror for changing direction of an optical path of the laser beam. The lens 22 is a lens having both powers of a collimator lens and a cylinder lens, which has a power only with respect to one of an X direction and a Y direction orthogonal to each other. Then, a radial laser light outputted by the semiconductor laser body 11 passes through this lens 22 and is thereby converted into a parallel light having a circular spot by the power of the collimator lens, and further into a beam having an elliptic spot by the power of the cylinder lens. The aperture 23 cuts an end of the beam which passed through the lens 22 to narrow it down to a desired diameter.

Then, the laser beam which passed through the aperture 23 is reflected by a vibrating mirror 31 vibrating in a seesaw manner as indicated by an arrow C, and is emitted to the outside from the opening 6 via an optical path indicated by a reference sign S. Thus, a scanning target object at a point the laser beam reaches can be scanned reciprocally with the laser beam.

Further, the module case 2 includes: a vibrating mirror holding member 32 made of resin which fixes to a front surface side of the vibrating mirror 31; a support shaft 34; and a coil 36, as structures for vibrating the vibrating mirror 31 made of metal, resin, or glass. Further, the vibrating mirror holding member 32 is held rotatably by a bearing 33 made of resin with the support shaft 34 being a rotation shaft, and a movable magnet (permanent magnet) 35 is attached on an opposite side of a side where the vibrating mirror 31 is attached. Further, a yoke 37 penetrates the coil 36 in a direction perpendicular to a winding direction thereof. FIG. 3 represents a cross section of the coil 36 and the yoke 37 that is taken along near the center of the yoke 37.

Then, the movable magnet 35 and the yoke 37 have straight shapes in parallel to each other in a non-operating state (state that electricity is not conducted through the coil 36), and a cross-sectional area of the yoke 37 in a direction orthogonal to the parallel direction is smaller than a cross-sectional area of the movable magnet in the same direction. Terminals of the coil 36 which are not illustrated are connected to the circuit substrate 3, and a control signal is supplied thereto from the circuit substrate 3.

Further, the yoke 37 is fixed by inserting into a pair of slits 8, 8 formed in a side wall part and an inner wall part of the module case 2 via an insulating member serving also as a bobbin of the coil 36. Disposition of this yoke 37, that is, disposition of the coil 36 is adjusted first and fixed at this position in consideration of magnetic forces.

Further, the movable magnet 35 of the vibrating mirror holding member 32 is disposed to be slightly separated from the coil 36. Then, the support shaft 34 thereof is covered with the bearing 33 which is a slide bearing, and both upper and lower surfaces in an axial direction thereof are loosely held by a not-illustrated slider fitted on the support shaft 34. Therefore, the vibrating mirror holding member 32 is structured to be supported on the support shaft 34 to be movable in a predetermined range in the axial direction thereof, and capable of making a minute vibrating movement.

Note that the slider is formed of a resin washer, is non-contact and has the role of preventing interference, and the vibrating mirror holding member 32 is in a floating state. In this state, when voltages in different directions are applied alternately to the coil 36, the vibrating mirror 31 vibrates in a seesaw manner around the support shaft 34 by operation of electromagnetic induction of the coil 36 and the movable magnet 35.

Further, the module case 2 also allows a reflected light from the scanning target object to be incident through the opening 6. Then, the incident reflected light is reflected by the vibrating mirror 31 and is incident on a light receiving lens 41 having a condensing power. The light returns from the same angle to the light receiving lens 41 irrespective of the phase of vibration of the vibrating mirror 31 (irrespective of scanning angle). Hence, even when the vibrating mirror 31 is vibrating, this point would not be a problem in particular.

At a point after the reflected light have passed the light receiving lens 41, a filter 42 selectively transmitting the light of the wavelength of the laser beam outputted by the laser light source unit 10 is provided, so as to cut any incident light from surroundings other than the reflected light of the scanning beam. For example, when a beam having a wavelength of 650 nm (nanometers) is used as the laser beam, a filter which selectively transmits a beam having a wavelength of 650 nm may be used as the filter 42. When an infrared laser is used, an infrared (IR) filter which selectively transmits an infrared ray having the wavelength thereof may be used.

Then, in the vicinity of the focal point of the light receiving lens 41 after the reflected light passed through the filter 42, an optical detection device 43 having a photodiode is provided by mounting on the circuit substrate 3. That is, while the light receiving lens 41 and the filter 42 are fixed to the module case 2, the optical detection device 43 is fixed to the circuit substrate 3 on an upper side in FIG. 1 and FIG. 2 differently from the lens and the filter.

This optical detection device 43 outputs an electrical signal according to a light amount received by the photodiode from an electrode provided on a surface opposite to a light receiving surface having the photodiode. Therefore, for example, when a reflected light of the laser beam which scanned over a code symbol in which black bars and white bars are arranged alternately is incident on the optical detection device 43, an electrical signal of low level can be obtained at a timing the reflected light is received from a position of a black bar with low reflectivity, and an electrical signal of high level can be obtained at a timing the reflected light is received from a position of a white bar with high reflectivity, as an output of the optical detection device 43. Accordingly, by extracting and analyzing the electrical signals outputted by the optical detection device 43 by the circuit substrate 3, disposition of bars can be estimated, and information meant by the code symbol can be read.

In the light scanning module 1 as has been described above, there are mainly four characteristic parts as follows.
(1) Structure of the optical detection device 43 and an attaching structure thereof to the circuit substrate 3.
(2) Procedure of attaching the laser light source unit 10 to the module case 2 and an attaching structure thereof.
(3) Disposition of the bearing 33 and the support shaft 34 of the vibrating mirror holding member 32.
(4) Function and structure of the lens 22.

Accordingly, these points will be described sequentially using more detailed views.

Figure 4:
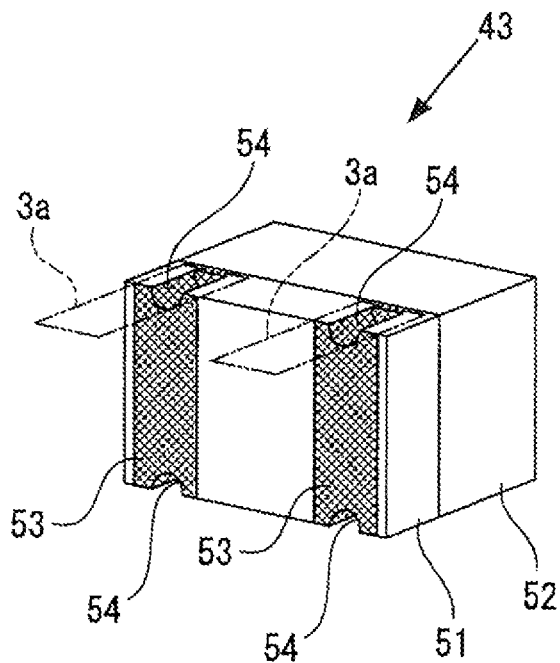
FIG. 4 is a perspective view of an optical detection device which the light scanning module illustrated in FIG. 1 includes.
Figure 5:
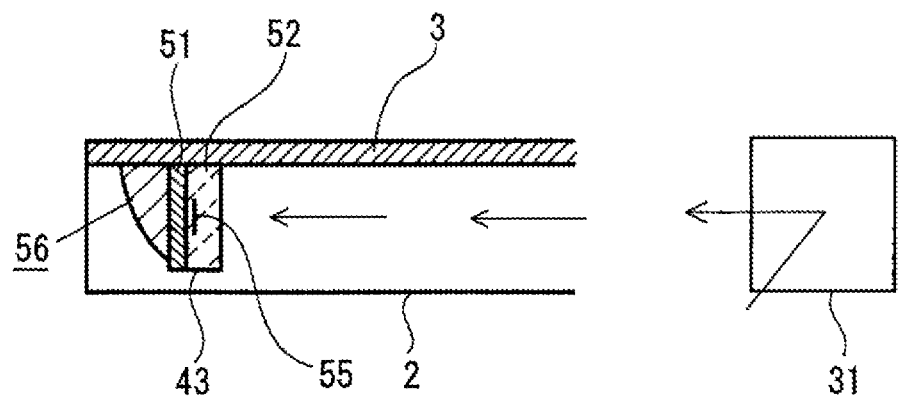
FIG. 5 is a view schematically illustrating disposition of an optical detection device in the light scanning module.
Figure 6:
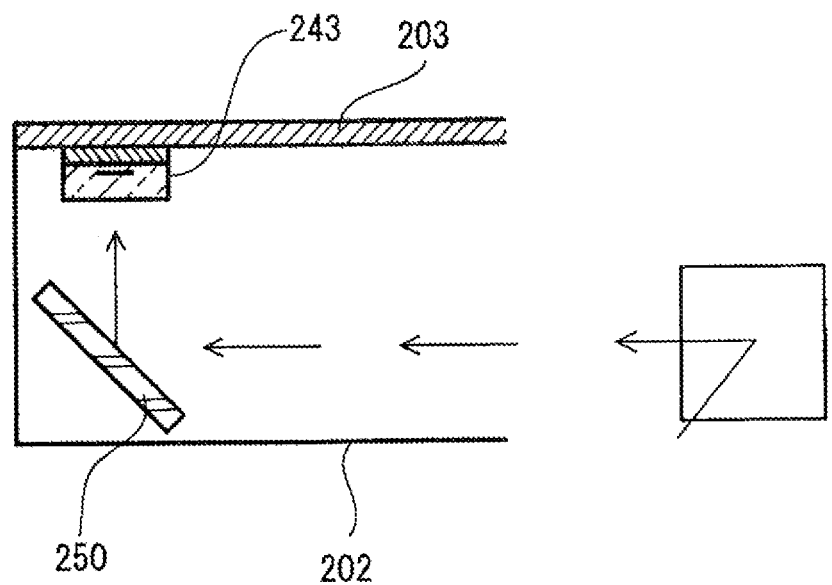
FIG. 6 is a view illustrating disposition of a conventional optical detection device of surface-mount type.

Structure of the optical detection device 43 and an attaching structure thereof to the circuit substrate 3: FIG. 4 to FIG. 6

First, structure of the optical detection device 43 and an attaching structure thereof to the circuit substrate 3 will be described.

FIG. 4 is a perspective view of the optical detection device 43. FIG. 5 is a view schematically illustrating disposition of the optical detection device 43 in the light scanning module 1.

The optical detection device 43 is structured by, as illustrated in FIG. 4, providing a photodiode (PD) 55 represented as a light receiving element in FIG. 5 on a substrate 51, and an upper side thereof is coated with a coating material 52 of transparent resin or the like for protecting the PD 55. That is, the PD 55 is provided on a surface on a side of the substrate 51 where the coating material 52 is provided.

Further, on a surface of the substrate 51 opposite to the surface where the PD 55 is provided, provided are a pair of planar output electrodes 53, 53 for outputting an electrical signal according to a light amount received by the PD 55. Regarding connection between the PD 55 and these output electrodes 53, 53, a publicly known structure may be employed appropriately, and thus an illustration and a description thereof are omitted here.

Further, on a surface of the substrate 51 that is different from the surface where the PD 55 is provided and the surface where the output electrodes 53 are provided and that is adjacent to the surface where the output electrodes 53 are provided, cutout portions 54 are provided respectively in contact with the output electrodes 53, and electrodes connected to the output electrodes 53 are provided respectively within the cutout portions 54.

In FIG. 4, the electrodes provided within the cutout portions 54 are indicated by adding the same hatchings as the output electrodes 53. However, it is not essential to form the electrodes provided within the cutout portions 54 in the same step as the output electrodes 53, and materials thereof need not be the same. Further, it is not necessary to provide the electrodes on the entire inner surfaces of the cutout portions 54.

However, when there are plural output electrodes 53, the cutout portions 54 and the electrodes therein are connected to the corresponding output electrode 53 for each of the output electrodes 53, such that different output electrodes 53 are not connected with each other.

Further, it is preferred that the cutout portions 54 are provided so as not to reach the surface of the substrate 51 where the PD 55 is provided. This is because such structure may adversely affect the coating of the coating material 52.

When the optical detection device 43 as described above is mounted on the circuit substrate 3, as illustrated in FIG. 4, the output electrodes 53 and the cutout portions 54 are disposed on the circuit substrate 3 after being aligned with pad electrodes 3a which are connection electrodes to be connected to the output electrodes 53, and the output electrodes 53 and the pad electrodes 3a are connected with solders 56.

At this time, by filling the solders 56 also in the cutout portions 54, the connection between the output electrodes 53 and the pad electrodes 3a can be secured easily and reliably via the electrodes provided within the cutout portions 54.

In the example illustrated in FIG. 5, the solders 56 are provided to cover not only the cutout portions 54 but also most of the output electrodes 53, and this is intended for increasing the connection area between the output electrodes 53 and the pad electrodes 3a as well as reinforcing an adhesive force between the optical detection device 43 and the circuit substrate 3. However, when it is desired to decrease the amount of using a solder, the connection is possible just by filling the solder in the cutout portions 54.

By using an attaching structure with respect to the optical detection device 43 and the circuit substrate 3 as described above, the small optical detection device can be attached easily so that the light receiving surface thereof is perpendicular to the circuit substrate 3. Therefore, as illustrated in FIG. 5, the reflected light which is incident from the outside and reflected by the vibrating mirror 31, which is a first optical member for allowing incidence on the PD 55 of the optical detection device 43, can be incident on the light receiving surface of the optical detection device 43 via the optical path parallel to the surface of the circuit substrate 3 where the pad electrodes 3a is provided (via the light receiving lens 41 and the filter 42 which are omitted in FIG. 5).

Further, an optical detection device in which the output electrodes 53 are provided on a rear surface of the substrate 51 such as the optical detection device 43 can be mass-produced, as inexpensive and small ones, by providing plural PDs 55 on the substrate 51 and coating them with the coating member 52, further providing the output electrodes 53, and thereafter cutting it into individual optical detection devices 43. The cutout portions 54 can also be formed by forming a hole before cutting the substrate and plating the inside thereof with an electrode material.

Note that an optical detection device in which the output electrodes 53 are provided on a rear surface of the substrate 51 has been conventionally known as a surface-mount type device, but a device of this type is based on the assumption that it is mounted on a circuit substrate so that output electrodes thereof oppose connection electrodes on the circuit substrate.

FIG. 6 illustrates disposition of such a conventional optical detection device 243 of this surface-mount type.

As illustrated in FIG. 6, in the case of the conventional optical detection device 243, it is inevitable that the light receiving portion is parallel to a surface of the circuit substrate 203 where the connection electrodes are provided, and if an optical path of a reflected light is set parallel to this surface, it is necessary to change direction of the optical path by providing a reflection mirror 250 in the middle in order to allow incidence of the reflected light to the light receiving portion.

Accordingly, the number of parts increases, and it is necessary to secure a certain degree of optical path length in a direction perpendicular to the circuit substrate 203. Thus, it is difficult to reduce a thickness (size in a direction perpendicular to the circuit substrate) of a light scanning module including a module case 202.

Further, an optical detection device in which the light receiving unit can be disposed perpendicular to the circuit substrate has been known hitherto, but this is one in which electrodes are formed of lead wires, and hence size reduction thereof is more difficult than the case of the above described optical detection device 243 due to problems of the number of parts and manufacturing steps.

On the other hand, in the structure illustrated in FIG. 4 and FIG. 5, size reduction of the optical detection device 43 itself is easy, and moreover, it is possible to allow incidence on the light receiving surface of the optical detection device 43 via an optical path parallel to the surface where the pad electrodes 3a of the circuit substrate 3 is provided. Thus, the thickness of the light scanning module 1 can be thinned also due to this point. Therefore, it can be said that this structure is quite useful for size reduction of the light scanning module 1.

Note that in the example illustrated in FIG. 4, although the cutout portions 54 are provided in two surfaces in contact with the output electrodes so that the optical detection device 43 can be mounted on the circuit substrate 3 without minding which surface should be the upside, the cutout portions 54 provided in at least one surface will suffice. Further, in the example illustrated in FIG. 4, the optical detection device 43 has a rectangular parallelepiped shape, but this is not restrictive. As long as the surface where the cutout portions 54 are provided and the surface where the PD 55 is provided (light receiving surface) are substantially perpendicular, the light receiving surface, in a state of being mounted on the circuit substrate 3, can be disposed substantially perpendicular to the surface of the circuit substrate where the connection electrodes are provided, and thus the above-described effects can be obtained.

Attachment of the laser light source unit 10 to the module case 2: FIG. 7 to FIG. 10B:

First, a procedure of attaching the laser light source unit 10 to the module case 2 and an attachment structure thereof will be described.

Figure 7:
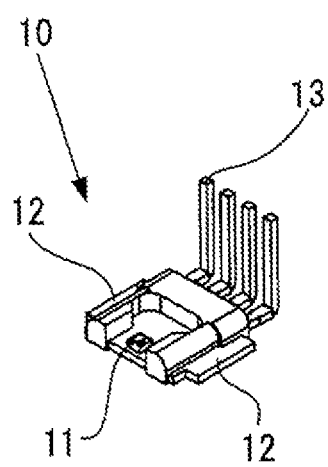
FIG. 7 is a perspective view of a laser light source unit which the light scanning module illustrated in FIG. 1 includes.
Figure 8A:
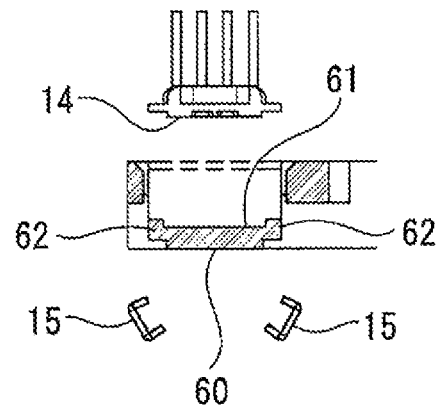
FIG. 8A is an explanatory view of a procedure of fixing the laser light source unit to a module case by clips.
Figure 8B:
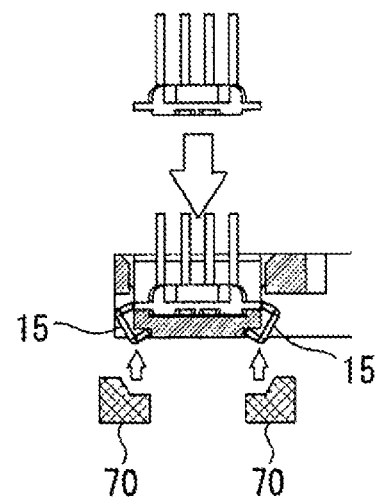
FIG. 8B is a subsequent view of the procedure.
Figure 8C:
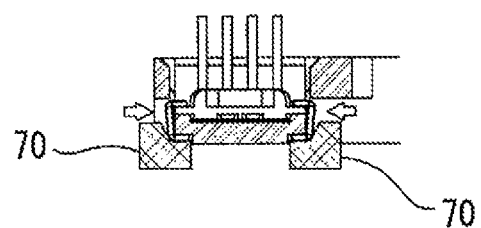
FIG. 8C is a subsequent view of the procedure.
Figure 8D:
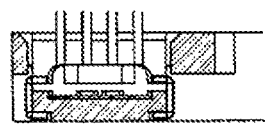
FIG. 8D is a subsequent view of the procedure.
Figure 9:
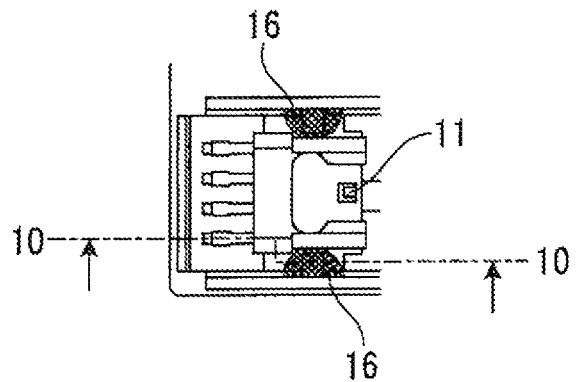
FIG. 9 is a plan view of a state that the laser light source unit is fixed to a pedestal.
Figure 10A:
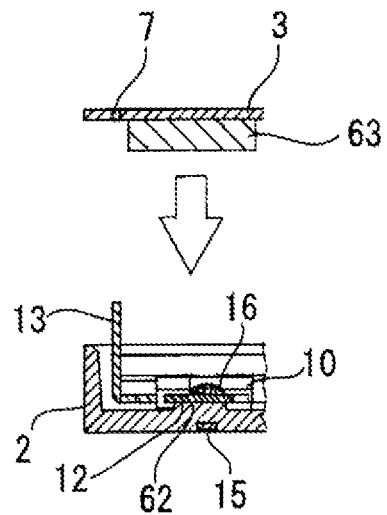
FIG. 10A is an explanatory view of a procedure of attaching a circuit substrate to the module case to which the laser light source unit is fixed.
Figure 10B:
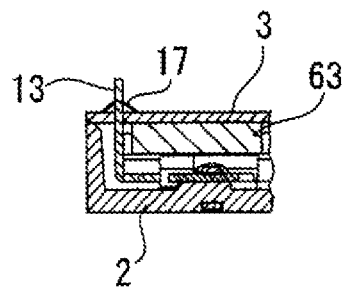
FIG. 10B is a subsequent view of the procedure.

FIG. 7 is a perspective view of the laser light source unit 10, FIG. 8A to FIG. 8D are explanatory views for the procedure of fixing the laser light source unit 10 to the module case 2 by the clips 15, FIG. 9 is a plan view of a state that the laser light source unit 10 is fixed to the pedestal 60, and FIG. 10A and FIG. 10B are explanatory views of a procedure of attaching the circuit substrate 3 to the module case 2 to which the laser light source unit 10 is fixed. Note that in FIG. 8A to FIG. 8D, cross-section lines for the laser light source unit 10 are omitted.

As described in the description of FIG. 3, the laser light source unit 10 includes, as illustrated in FIG. 7: the semiconductor laser body 11 in the vicinity of one end; the pair of flange-shaped projecting portions 12, 12 on side surfaces; and the four terminals 13 on an end opposite to the semiconductor laser body 11. The terminals 13 are structured to be bent to penetrate the circuit substrate 3 and project upward in a state of forming the light scanning module 1. By this structure, a necessary space behind for mounting the laser light source unit 10 is reduced.

Further, although cross-section lines are omitted for convenience of illustration, in FIG. 8A to FIG. 8D, the procedure of fixing the laser light source unit 10 to the module case 2 by the clips 15, 15 is illustrated by cross-sectional views seen from a lower side of FIG. 3 at a position of a line coupling vicinities of centers of the two clips 15, 15 in FIG. 3. Therefore, in FIG. 8A to FIG. 8D, the laser light is outputted from a far side to a near side of the views, and this direction is a direction of an optical path of a beam which is deflected by the mirror 21 and passes through the optical axis of the lens 22.

As can be seen from FIG. 8A, the pedestal 60 is formed on the module case 2, and the laser light source unit 10 is disposed thereon. Further, in the pedestal 60, a trench 61 is formed in a center portion, and a pair of projecting portions 62, 62 is formed on both ends.

Then, when the laser light source unit 10 is disposed on the pedestal 60, the laser light source unit 10 is inserted in the module case 2 from above in the view, and as illustrated in FIG. 8B, a portion 14 (located on a side opposite to the circuit substrate 3) lower than the projecting portions 12 of the laser light source unit 10 is fitted in the trench 61 of the pedestal 60. The width of the portion indicated by a reference sign 14 is substantially the same as the width of the trench 61, allowing the laser light source unit 10 to move on the pedestal 60 only in a direction parallel to the trench 61, that is, the direction of the optical path of the beam passing through the optical axis of the lens 22.

Further, in a state that the laser light source unit 10 is disposed on the pedestal 60, the projecting portions 12, 12 of the laser light source unit 10 and the projecting portions 62, 62 of the pedestal 60 are in a state of contacting each other via a flat surface.

Then, in this state, the clips 15, 15 having elasticity which are a first fixing means are inserted from the left and right sides of FIG. 8B, that is, from a direction perpendicular to the optical path of the beam passing through the optical axis of the lens 22, and by pressing them from a lower side and lateral sides with jigs 70, 70 as illustrated in FIG. 8B and FIG. 8C, the projecting portions 12, 12 of the laser light source unit 10 and the projecting portions 62, 62 of the pedestal 60 can be sandwiched and fixed by the clips 15, so that they do not separate from each other as illustrated in FIG. 8D. In the stage of performing this fixing, it is not necessary to care so much about the position of the laser light source unit 10 along the direction of the optical path of the beam passing through the optical axis of the lens 22.

FIG. 9 is a plan view illustrating an attaching position of the laser light source unit 10 in this state.

Note that the clip 15 on the left side in FIG. 8A to FIG. 8D can be inserted via the slit 5 provided in a side surface of the module case 2, and the clip 15 on the right side in the views can be inserted via a gap 9 (see FIG. 3) provided in a bottom surface of the module case 2.

Further, in a state that the laser light source unit 10 is fixed to the pedestal 60 by the clips 15, the laser light source unit 10 does not move in a leftward and rightward direction and an upward and downward direction in FIG. 8D. However, in a direction from a far side to a near side or from the near side to the far side in the views, no member to restrict this movement exists. Therefore, by adding a force of a degree to resist a friction force by pressing the projecting portions 12, 12 and the projecting portions 62, 62 by the clips 15, 15, the laser light source unit 10 can be moved in a direction from the far side to the near side or from the near side to the far side in the views on the pedestal 60.

Then, by moving the laser light source unit 10 in this state, the optical path length from the semiconductor laser body 11 to the lens 22 can be adjusted and the semiconductor laser body 11 can be disposed in the vicinity of the focal point of the lens 22, so that a beam spot of an appropriate size can be obtained by the lens 22.

Note that when the projecting portions 12, 12 and the projecting portions 62, 62 have a substantially constant width in their longitudinal direction, that is, in the direction of the optical path of the beam passing through the optical axis of the lens 22, the clips 15, 15 would not be pushed outward and removed by the projecting portions, or the widths of the projecting portions sandwiched by the clips 15, 15 would not become narrow to weaken the fixing force when the laser light source unit 10 is slid and moved on the pedestal 60.

Further, if the laser light source unit 10 is disposed before the vibrating mirror 31 is attached to the module case 2, a focal point adjusting mirror (not illustrated) can be inserted at the position of the vibrating mirror 31 to reflect a laser beam emitted through the lens 22 and the aperture 23 to lead it to the outside, and the laser light source unit 10 can be moved to determine its position while measuring the diameter of this laser beam accurately by using a laser beam measuring device (not illustrated). The focal point adjusting mirror may be removed after the adjustment is finished.

After the adjustment as described above is finished, the clips 15, 15 and the projecting portions 12, 12 on the laser light source unit 10 side and the projecting portions 62, 62 on the pedestal 60 side are fixed respectively by adhesives 16, 16, which are a second fixing means, so that the laser light source unit 10 does not move not only in the other directions but also in the direction of the optical path of the beam passing through the optical axis of the lens 22 (these adhesives 16, 16 are omitted from illustration in FIG. 3).

Further, after fixing with the adhesives is performed and all necessary parts including the vibrating mirror 31 and so on are attached to the module case 2, as illustrated in FIG. 10A and FIG. 10B, the circuit substrate 3 is assembled with the module case 2 by the screws 4, 4 illustrated in FIG. 1 (FIG. 10A and FIG. 10B illustrate cross sections of respective parts at a position of 10-10 line of FIG. 9). At this time, the terminals 13 of the laser light source unit 10 penetrate the through holes 7 provided in the circuit substrate 3. Then, the terminals 13 are connected to not-illustrated electrodes on the circuit substrate 3 with a solder 17, thereby embedding the through hole 7.

Note that due to manufacturing errors or the like of the module case 2, dispersion depending on an individual piece occurs regarding the position of the laser light source unit 10 after the position adjustment. Therefore, the diameter of each through hole 7 may be made slightly larger than the cross section of each terminal 13 so that the terminal 13 can penetrate the through hole 7 even when the position of the laser light source unit 10 is displaced in some measure.

Further, in the circuit substrate 3, in a portion located directly above the laser light source unit 10 in a state of being assembled with the module case 2, an analog LSI 63 for converting an analog electrical signal outputted by the optical detection device 43 into digital data is provided, thereby effectively utilizing the space.

In the attachment method and the attachment structure of the laser light source unit 10 to the module case 2 which have been described above, the laser light source unit 10 can be moved in the same way both in a direction to be close to the lens 22 and a direction to separate from the lens 22 in a state of being fixed to the pedestal 60 with the clips 15, 15.

Therefore, as compared to the case where alignment of a light source is performed by press fitting the light source into a lens barrel hole as described in PTL2, adjustment is easy, and also accurate adjustment is possible.

Specifically, in the case of press fitting, when the unit is press fitted once and the light source becomes close to the collimator lens, adjustment in the direction to separate from the lens is not possible thereafter. Therefore, it is necessary to perform the pressing operation carefully so as not to pass a target point, and in some cases the adjustment must be stopped slightly before the target point in consideration of safety.

However, in the structure and the procedure described above using FIG. 7 to FIG. 10B, even in the case where the laser light source unit 10 is made too close to the lens 22, adjustment to separate it again can be performed easily. Thus, the laser light source unit 10 can be adjusted without being afraid of making it too close, and moreover the adjustment can be repeated until an error from the target point becomes sufficiently small.

Further, the structure would not be complicated, and when the entire size is reduced, parts may be produced inexpensively and precisely.

Further, by providing the trench 61 for fitting the laser light source unit 10 in the pedestal 60, at a time of adjustment, the laser light source unit 10 can be prevented easily from moving in a direction that is different from the optical path passing through the optical axis of the lens 22 and in which no adjustment is necessary.

Further, by providing the projecting portions 12, 12 and the projecting portions 62, 62, the clips 15, 15 can be inserted simply with the jigs as illustrated in FIG. 8A to FIG. 8D, and thus the fixing step can be performed easily.

Moreover, when the pedestal 60 is provided in an end of the module case 2, at least one gap for inserting the clip 15 can be provided in a side face of the module case 2, and thereby constraints in design can be reduced as compared to the case where the gap is provided in a bottom surface.

Figure 11:
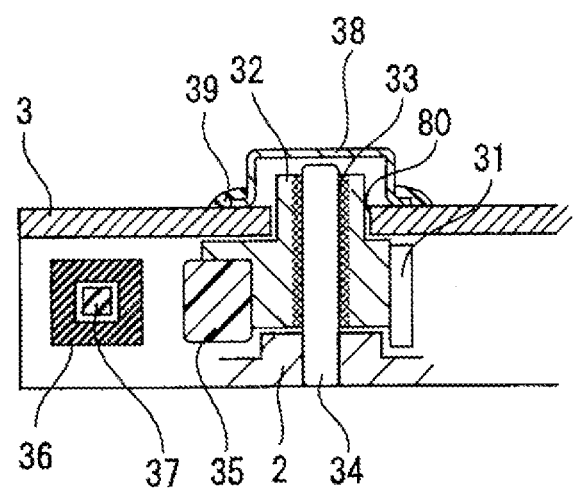
FIG. 11 is a view schematically illustrating a cross section of a part ranging from a coil to a support shaft and a vibrating mirror holding member of the light scanning module illustrated in FIG. 1.
Figure 12:
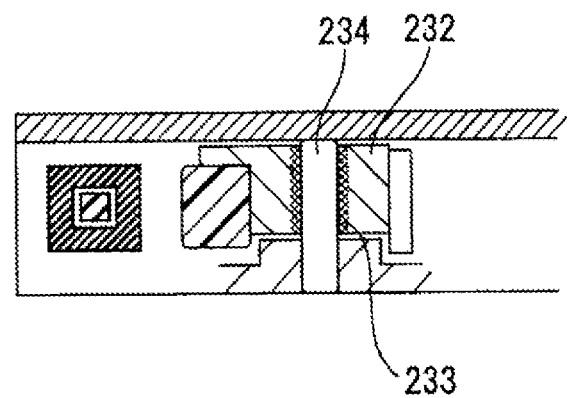
FIG. 12 is a view illustrating a cross section corresponding to FIG. 11 in a comparative example.

Disposition of the bearing 33 and the support shaft 34 of the vibrating mirror holding member 32: FIG. 11 and FIG. 12

Next, disposition of the bearing 33 and the support shaft 34 of the vibrating mirror holding member 32 will be described.

FIG. 11 is a view schematically illustrating a cross section of a part ranging from the coil 36 to the support shaft 34 and the vibrating mirror holding member 32 of the light scanning module 1. FIG. 12 is a view illustrating a cross section corresponding to this part in a comparative example. However, in these views, for convenience of illustration, the cross section of the module case is illustrated only in the vicinity of a fixing part of the support shaft 34, 234.

The light scanning module 1 is structured such that, as illustrated in FIG. 11, an opening 80 is provided at a position on the circuit substrate 3 that corresponds to the support shaft 34, and one ends of the support shaft 34 and the bearing 33 penetrate this opening 80. Further, the other end of the support shaft 34 is fixed to the module case 2.

By employing such a structure, the size of the bearing 33 can be determined without being restricted by the thickness of the light scanning module 1 (size in a longitudinal direction of the support shaft 34).

As in the comparative example illustrated in FIG. 12, when a support shaft 234 and a bearing 233 are accommodated inside the light scanning module, if thickness of the light scanning module is small, it is not possible to take a sufficient length of the bearing part, resulting in displacement of positional relation between the bearing 233 and the support shaft 234 and a risk that the rotation of a vibrating mirror holding member 232 around the support shaft 234 sways easily (the rotation axis of the vibrating mirror holding member 232 is easily displaced from the support shaft 234).

However, in the structure as illustrated in FIG. 11, there is no such problem, and the vibrating mirror holding member 32 can be rotated stably around the support shaft 34 even when thickness of the light scanning module 1 is small. Therefore, the light scanning module 1 can be made small without being limited by constraints in size of the bearing part.

Note that in the light scanning module 1, as illustrated in FIG. 11, on a surface of the circuit substrate 3 that is opposite to the module case 2, the cover 38 is provided so as to cover the support shaft 34 and the bearing 33 projecting from the opening 80. This cover 38 is fixed to the circuit substrate 3 with a solder 39.

By providing such a cover 38, it is possible to prevent entrance of a foreign material and moisture into the bearing part of the vibrating mirror holding member 32. When a foreign material or moisture enters the bearing part, it hinders smooth rotation between the support shaft 34 and the bearing 33, and thus it is useful to prevent this by the cover 38. However, the cover 38 is not essential. Further, fixing to the circuit substrate 3 can be performed by an arbitrary fixing means, such as an adhesive, a fastener such as a screw, or fitting into the circuit substrate 3.

Further, in the example illustrated in FIG. 11, although the opening 80 is provided in the circuit substrate 3, the opening may be provided in a surface where the support shaft 34 collides when it is extended toward a side opposite to its fixed position, and it is not necessary to be on the circuit substrate.

Further, the bearing 33 which penetrates the opening 80 may be formed to have an arbitrary thickness. That is, it is not necessary to have a minimum thickness for performing the bearing function. Then, by making the diameter of the opening 80 substantially the same as and slightly larger than the diameter of the bearing 33 penetrating the opening, in case the rotation shaft of the vibrating mirror holding member 32 is displaced from the support shaft 34, the vibrating mirror holding member 32 including the bearing 33 is supported by the opening 80, and enlargement of the displacement can be prevented.

Function and Structure of the Lens 22: FIG. 13 to FIG. 17:

Next, function and structure of the lens 22 will be described.

Figure 13A:
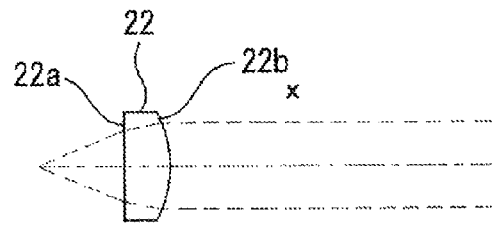
FIG. 13A is a view for explaining power that a lens provided in the light scanning module illustrated in FIG. 1 has.
Figure 13B:
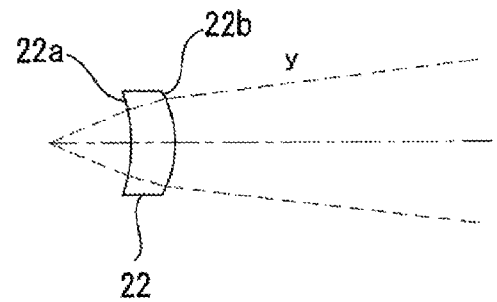
FIG. 13B is another view of FIG. 13A.
Figure 14:
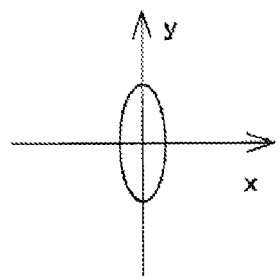
FIG. 14 is a diagram illustrating a shape of a spot formed by a laser light which passed through the lens.
Figure 15:
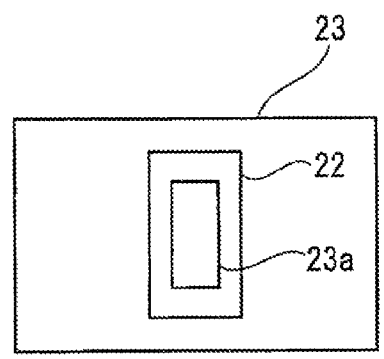
FIG. 15 is a diagram illustrating a shape of the lens.
Figure 16A:
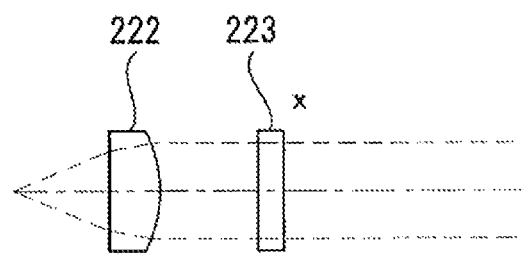
FIG. 16A is a view corresponding to FIG. 13A for explaining power of a lens in a comparative example.
Figure 16B:
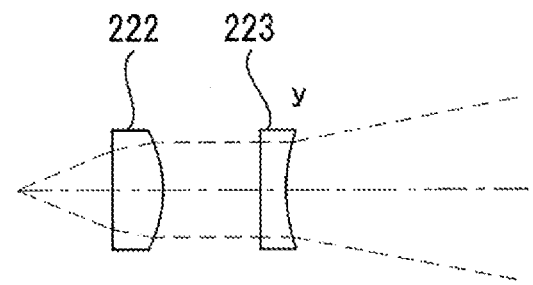
FIG. 16B is another view corresponding to FIG. 13B.
Figure 17:
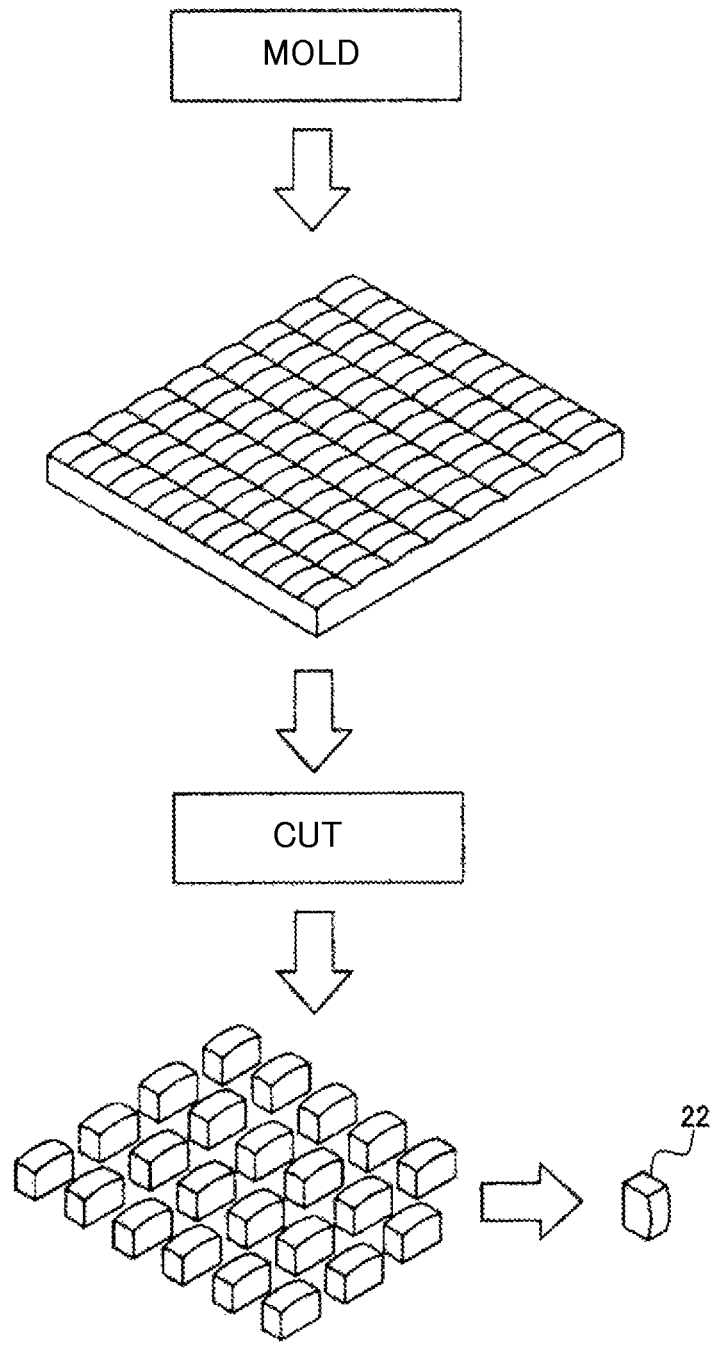
FIG. 17 is a view for explaining a manufacturing method for the lens having the shape illustrated in FIG. 15.

FIGS. 13A and B are views for explaining power of the lens 22, FIG. 14 is a diagram illustrating a shape of a spot formed by the laser light which passed through the lens 22, FIG. 15 is a diagram illustrating a shape of the lens 22, FIG. 16A and FIG. 16B are views corresponding respectively to FIG. 13A and FIG. 13B for explaining power of a lens in a comparative example, and FIG. 17 is a view for explaining a manufacturing method for the lens 22.

When the light scanning module 1 is used for reading a code symbol in which bar-shaped modules are arranged, such as a bar code or a two-dimensional bar code, it is preferred that the spot of a beam light which scans the code symbol be an ellipse having a long axis which matches the longitudinal direction of the code symbol, rather than a true circle. This is because influence of a stain or scratch on the bars can be decreased.

Accordingly, in the light scanning module 1, in order to obtain an elliptic spot as described above, a lens having both powers of a collimator lens and a cylinder lens which has a power only with respect to one of an X direction and a Y direction orthogonal to each other, is used as the lens 22 (the X axis and the Y axis are both an axis perpendicular to the optical axis).

As a more specific shape, shapes of a cross section of a plane including the optical axis and the X axis and a cross section of a plane including the optical axis and the Y axis of the lens 22 are illustrated in FIG. 13A and FIG. 13B, respectively.

As can be seen from these views, in the lens 22, one surface 22a is formed such that a cross section in the X axis direction is a plane and a cross section in the Y axis direction is a concave shape so as to obtain power of a cylinder lens, and the other surface 22b is formed such that both a cross section in the X axis direction and a cross section in the Y axis direction are a convex so as to obtain power of a collimator lens.

Then, a laser light emitted from the semiconductor laser body 11 of the laser light source unit 10 disposed at an appropriate position and passed through this lens 22 forms an elliptic beam spot with the Y axis direction being a long axis as illustrated in FIG. 14. Thereafter, a portion at an end where the beam spot profile is not stable is cut by the aperture 23, and thereafter the beam is reflected by the vibrating mirror 31 and emitted to the outside.

Here, as illustrated in FIG. 15, the lens 22 has a rectangular shape which is the same shape as the opening 23a of the aperture 23, and has a slightly larger size than the opening 23a. This size is employed for making the laser beam which passed through the lens 22 reach the aperture 23 larger in size than the opening 23a. Therefore, in the Y axis direction in which the beam has a spread, a size smaller than the opening 23a is acceptable.

Since the end of the laser beam which passed through the lens 22 is cut by the aperture 23 and does not pass through the opening 23a, the size of the lens 22 does not affect the quality of the scanning beam when it is of this degree. On the other hand, normally the lens is produced to have a circular shape at the time of production. However, if a lens having a diameter which matches a long side of the opening 23a is used, the same width is needed also in a short side direction for disposing the lens, and a waste of space occurs.

Therefore, by using the lens 22 of the same shape as the opening 23a, this waste of space is reduced, and this can contribute to the light scanning module 1.

Further, rather than providing a collimator lens 222 and a cylindrical lens 223 as in the comparative example illustrated in FIG. 16A and FIG. 16B, realizing the power combining them by one lens as the lens 22 does can reduce the arrangement space due to decrease of the number of lenses.

Note that in order to match the shape of the lens 22 with the opening 23a, a rectangular lens may be produced in the beginning For example, as illustrated in FIG. 17, by cutting a lens plate, which is molded into a shape combining many lenses, into sizes of individual lenses, lenses having a rectangular shape can be produced inexpensively.

Further, since the lens 22 differs in power depending on the direction, it must be attached in the right direction when being attached to the module case 2. In this point, when it is a circular shape symmetric with respect to a point, the right direction cannot be comprehended easily. However, when it is in a rectangular shape, the direction can be matched easily at a time of attachment by cutting the lens while matching the X axis and the Y axis with a short side and a long side respectively, and this can contribute to reduction of the number of manufacturing steps.

Figure 18:
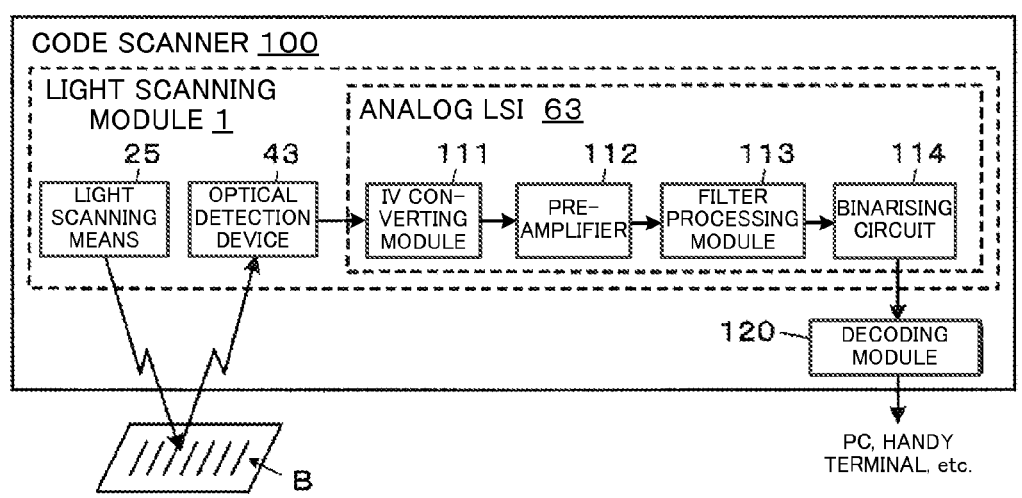
FIG. 18 is a block diagram illustrating a structure of a code scanner which is an embodiment of the optical information reading device of the invention.

An embodiment of the optical information reading device: FIG. 18:

Next, an embodiment of the optical information reading device including the light scanning module 1 described above will be described.

FIG. 18 is a block diagram illustrating a structure of a code scanner 100 which is an embodiment of the optical information reading device.

This code scanner 100 is a device for reading a bar code which is a code symbol in which white bars and black bars which are modules having different light reflectivity from the surroundings are arranged. Then, as illustrated in FIG. 18, the scanner includes a light scanning module 1 and a decoding unit 120.

Among them, the light scanning module 1 is the light scanning module which has been described using FIG. 1 to FIG. 17. A light scanning means 25 represents an optical system outputting a scanning beam from the laser light source unit 10 to the vibrating mirror 31. The optical detection device 43 is the optical detection device 43 illustrated in FIG. 3 and the like.

Then, when an electrical signal corresponding to the intensity of a reflected light of a beam outputted by the light scanning means 25 and reflected by a bar code B formed on a reading target object is outputted by the optical detection device 43 to the pad electrode 3a on the circuit substrate 3 via the output electrodes 53, this signal is inputted to the analog LSI 63 on the circuit substrate 3.

This analog LSI 63 has, as illustrated in FIG. 18, an IV converting module 111, a preamplifier 112, a filter processing module 113, and a binarizing circuit 114, and is a circuit which processes an electrical signal outputted by the optical detection device 43 and outputs a pulse sequence to be subjected to decoding of a bar code symbol.

More specifically, first the IV converting module 111 converts an electric current signal outputted from the photodiode of the optical detection device 43 into a voltage signal. Then, the preamplifier 112 amplifies the voltage signal converted by the IV converting unit 111. This IV converting module 111 and the preamplifier 112 form an amplifying module which converts the electric current signal into the voltage signal and amplifies this signal.

Thereafter, the filter processing module 113 performs noise removal processing on the signal outputted from the preamplifier 112, and the signal is inputted to the binarizing circuit 114. The binarizing circuit 114 is formed of a low-pass filter and a logic circuit, and outputs a pulse sequence indicating positions of the white bar portions and the black bar portions corresponding to a row of bars of the bar code.

By inputting this pulse sequence to the decoding module 120, information of the sequence of the white bars and the black bars can be obtained, and it can be converted into information meant by this sequence.

The code scanner 100 may have a means for outputting the information obtained by the decoding module 120 to an external information processing apparatus such as a personal computer or a handy terminal. Further, the decoding module 120 may exist outside the code scanner 100.

The description of the embodiments is finished thus, but of course the structures of the devices, types of code symbols as a reading target, and so on are not limited to those described in the above-described embodiments.

Further, the optical information reading device of the invention can be structured as either of a stationary type device and a handheld device. Further, the optical devices of the invention, such as the light scanning module 1 and so on, are preferred to be applied to an optical information reading device, but they are not restricted from being applied to other devices. The same applies to the optical detection device and the light source fixing method.

Further, the structure and the modification example which have been described can be applied individually or can be combined appropriately and applied within a range which is not inconsistent. In particular, the characteristics listed as (1) to (4) can exhibit their effects sufficiently even when they are applied individually. When only part of the characteristics is applied, for parts to which the characteristics listed as (1) to (4) are not applied, it is also possible to apply a structure that is described as a comparative example or a conventional example.

INDUSTRIAL APPLICABILITY

By using the optical detection device, the optical device, or the light source fixing method according to the invention, a module which scans a target object with a light beam and detects a reflected light thereof can be reduced in size. Further, with the optical information reading device of the invention, the device can be reduced in size by utilizing the optical detection device or the optical device as described above.

REFERENCE SIGNS LIST

1 . . . light scanning module, 2 . . . module case, 3 . . . circuit substrate, 4 . . . screw, 5 . . . slit, 6 . . . opening, 7 . . . through hole, 8 . . . slit, 9 . . . gap, 10 . . . laser light source unit, 11 . . . semiconductor laser body, 12 . . . projecting portion, 13 . . . terminal, 15 . . . clip, 21 . . . mirror, 22 . . . lens, 23 . . . aperture, 31 . . . vibrating mirror, 32 . . . vibrating mirror holding member, 33 . . . bearing, 34 . . . support shaft, 35 . . . movable magnet, 36 . . . coil, 37 . . . yoke, 38 . . . cover, 39 . . . solder, 41 . . . light receiving lens, 42 . . . filter, 43 . . . optical detection device, 51 . . . substrate, 52 . . . coating material, 53 . . . output electrode, 54 . . . cutout portion, 55 . . . PD, 60 . . . pedestal, 61 . . . trench, 62 . . . projecting portion, 63 . . . analog LSI, 70 . . . jig, 80 . . . opening, 100 . . . code scanner.

The invention claimed is:

1. A lens comprising:
   a power to diverge light in a direction of a first axis and another power in a direction of a second axis different from the power in the direction of the first axis, on one surface of the lens, the first axis and the second axis respectively being perpendicular to an optical axis of the lens and perpendicular to each other;
   a power of collimate lens on another surface of the lens,
   wherein the lens makes a laser beam which is emitted from a laser light source and passes through the lens along the optical axis of the lens form an elliptic beam spot.

2. A lens according to claim 1, wherein the lens is in a rectangular shape and the first axis is in parallel with a long side of the lens.

3. An optical device comprising:
   a lens according to claim 1;
   the laser light source; and
   an irradiator for irradiating a target object with a laser light emitted from the laser light source through the lens and an aperture having a slit-shaped opening,
   wherein the lens is disposed before the aperture in an optical path of the laser beam, and the lens has a same shape as the opening of the aperture and a size such that the laser beam which passes through the lens reaches the aperture with a size larger than the opening.

4. An optical device comprising:
   a lens according to claim 2;
   the laser light source; and
   an irradiator for irradiating a reading target object with a laser light emitted from the laser light source through the lens and an aperture having a slit-shaped opening,
   wherein the lens is disposed before the aperture in an optical path of the laser beam, and the lens has a same shape as the opening of the aperture and a size such that the laser beam which passed through the lens reaches the aperture with a size larger than the opening.

5. A method for producing a lens according to claim 2, comprising:
   a first step of molding a member in a shape of a plurality of the lens arranged in a matrix in a plane; and
   a second step of cutting the molded member into a size of each lens.

* * * * *